(12) United States Patent
Courtemanche

(10) Patent No.: US 7,048,344 B2
(45) Date of Patent: May 23, 2006

(54) ENDLESS TRACK FOR A TRACK-PROPELLED VEHICLE

(75) Inventor: Denis Courtemanche, Richmond (CA)

(73) Assignee: Camoplast, Inc., Sherbrooke (CA)

( * ) Notice: Subject to any disclaimer, the term of this patent is extended or adjusted under 35 U.S.C. 154(b) by 175 days.

(21) Appl. No.: 10/772,421

(22) Filed: Feb. 6, 2004

(65) Prior Publication Data
US 2004/0227401 A1    Nov. 18, 2004

(30) Foreign Application Priority Data
Feb. 6, 2003   (CA) ................................ 2418556

(51) Int. Cl.
  *B62D 55/24* (2006.01)
(52) U.S. Cl. ........................... 305/165; 305/178
(58) Field of Classification Search ............. 305/160, 305/165, 178, 179, 180
  See application file for complete search history.

(56) References Cited

U.S. PATENT DOCUMENTS

| 3,841,167 | A | * | 10/1974 | Reedy | ................ | 305/181 |
| 5,713,645 | A | * | 2/1998 | Thompson et al. | ......... | 305/168 |
| 6,575,540 | B1 | * | 6/2003 | Soucy et al. | ................ | 305/166 |
| 6,935,708 | B1 | * | 8/2005 | Courtemanche | ............ | 305/165 |
| 2003/0111903 | A1 | * | 6/2003 | Katayama et al. | .......... | 305/179 |
| 2004/0026995 | A1 | * | 2/2004 | Lemieux | ..................... | 305/178 |
| 2005/0168070 | A1 | * | 8/2005 | Dandurand | ................. | 305/178 |

FOREIGN PATENT DOCUMENTS

CA     2319934     9/2000

* cited by examiner

*Primary Examiner*—Russell D. Stormer
(74) *Attorney, Agent, or Firm*—Smith, Gambrell & Russell

(57) ABSTRACT

The ground engaging outer side of an endless track of a track-propelled vehicle displays a series of longitudinally spaced profiles which are defined by a central portion and two opposite lateral portions; the rubber material of the lateral portions of the body has a hardness which is greater than the hardness of the rubber material of the central portion of the body.

8 Claims, 3 Drawing Sheets

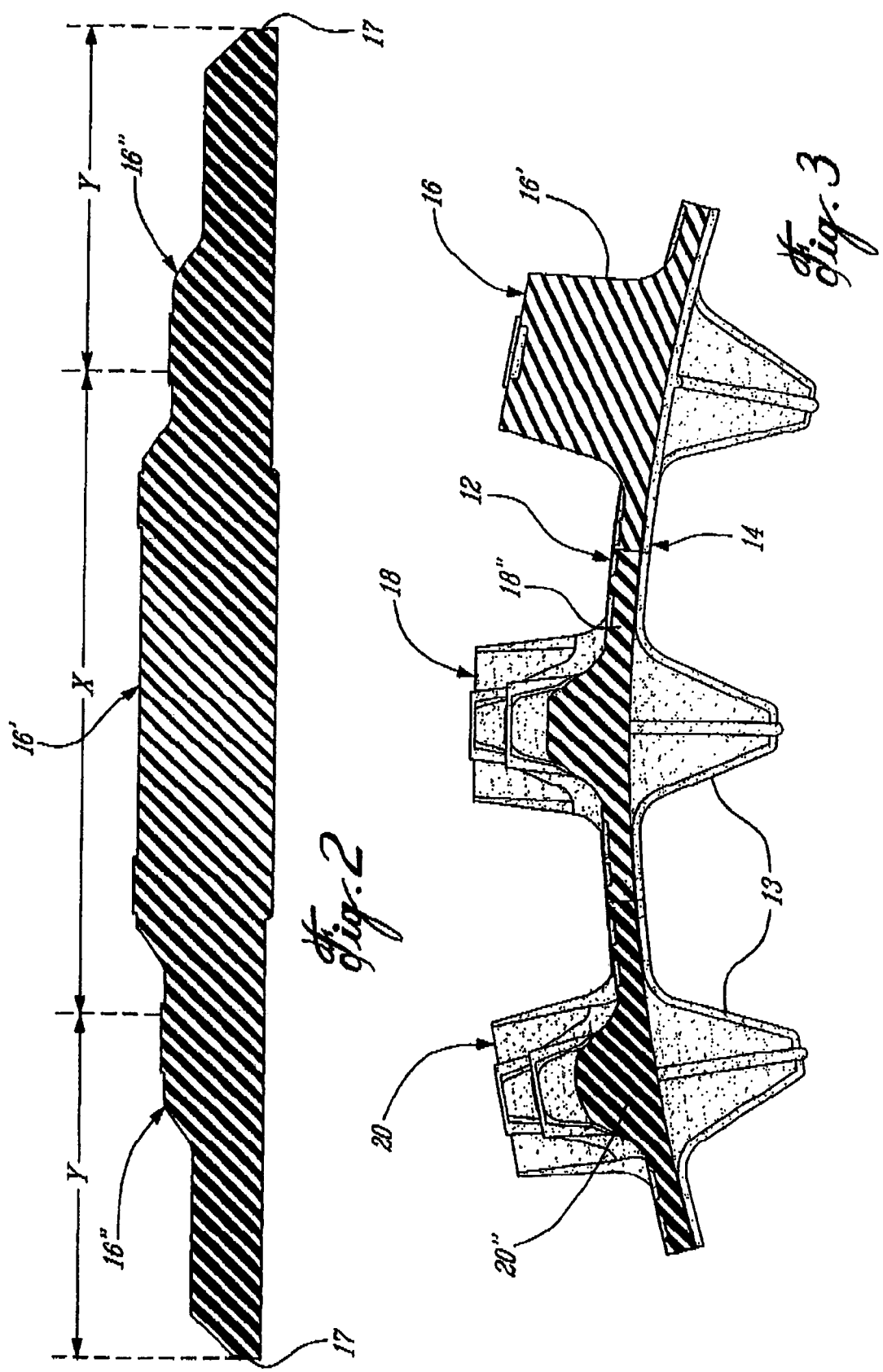

ENDLESS TRACK FOR A TRACK-PROPELLED VEHICLE

FIELD OF THE INVENTION

The present invention pertains to the construction of an endless track for a track-propelled vehicle.

BACKGROUND OF THE INVENTION

Endless tracks for track-propelled vehicles are well known. They essentially consist of an endless body made of reinforced rubber material wherein the ground engaging outer side of the body is formed of a series of longitudinally spaced profiles. Endless tracks mounted on snowmobiles are usually provided with a series of longitudinally spaced embedded rods to reinforce the rubber material. However, on other vehicles such as vehicles which are driven on snow or grounds that would not adequately support wheels, endless tracks, which are usually of smaller width than that found on snowmobiles, are provided without the presence of reinforcing rods as indicated above.

In Canadian patent application 2,319,934 filed Sep. 18, 2000 in the name of Soucy et al., there is provided a rubber band track with various hardnesses. However, the track described is characterized by a central portion made of rubber material having a hardness which is greater than the hardness of the rubber material in the opposite lateral band portions of the body.

However, it has been noted that some resiliency is needed in the central portion for the wheels which bear on the inner surface of the endless track.

STATEMENT OF THE INVENTION

The present invention is therefore concerned with providing an endless track for a track-propelled vehicle which overcomes the above-described problem.

This is achieved by providing an endless track for a track-propelled vehicle which comprises a body made of a reinforced rubber material, the body having a ground-engaging outer side on which are disposed a series of longitudinally spaced profiles, and an inner side; the body defines a laterally extending central portion and two opposite lateral portions; the track is characterized in that the rubber material of the lateral portions of the body has substantially a hardness which is greater than the hardness of the rubber material of the central portion.

In one form of the invention, the rubber material of the lateral portions of the body has an average hardness of between about 75 and about 90 duro A.

In another form of the invention, the rubber material of the central portion of the body has an average hardness of between about 55 and about 75 duro A.

Objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a cross-sectional view taken along lines 2—2 of FIG. 1;

FIG. 3 is a cross-sectional view taken along lines 3—3 of FIG. 1; and

DETAILED DESCRIPTION

Figure 1:
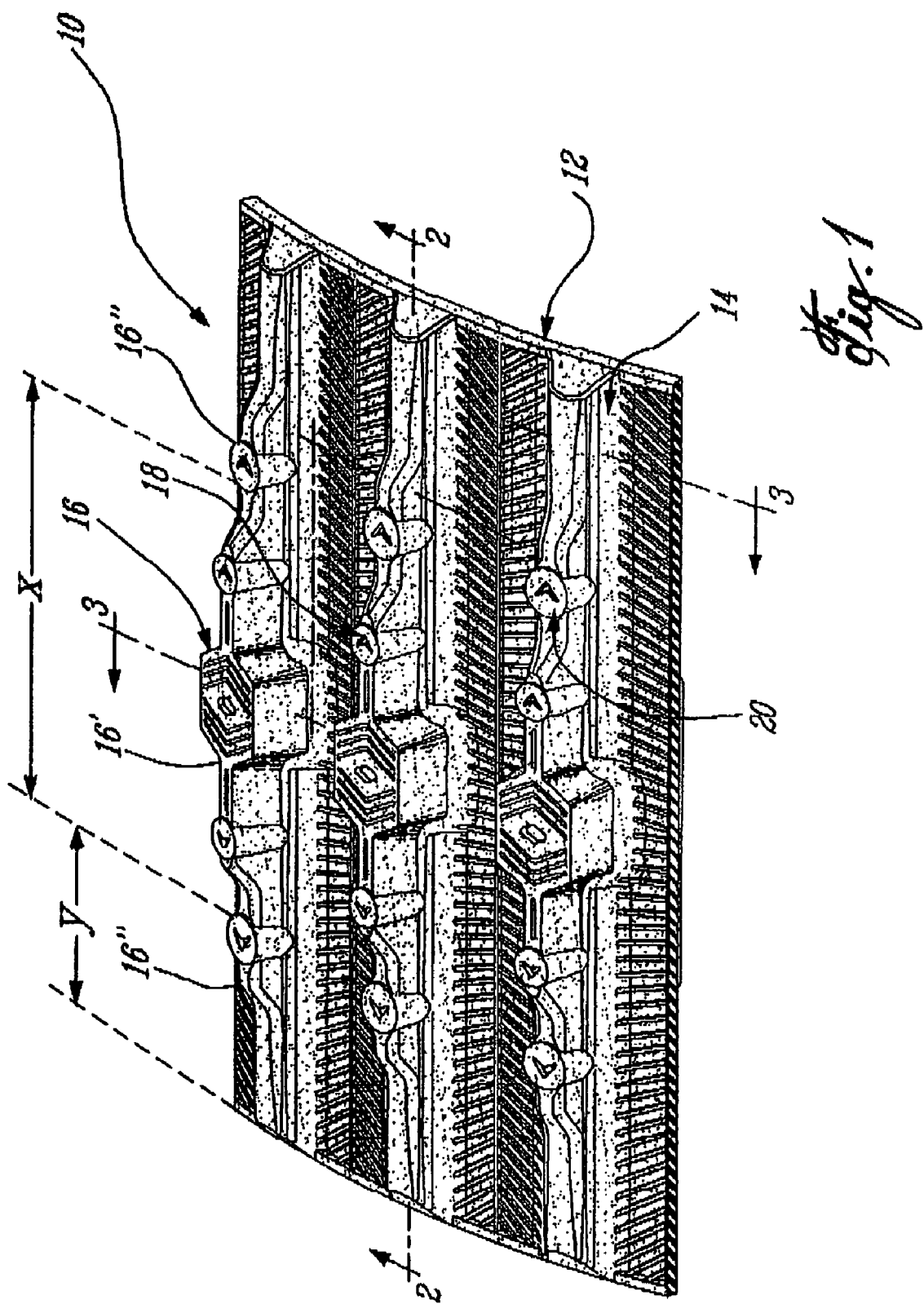
FIG. 1 is a perspective view of a portion of a track made in accordance with the present invention.

Referring to FIGS. 1, 2 and 3, there is shown a portion 10 of an endless track made in accordance with the present invention. The track is formed of molded reinforced rubber material, the construction of which is well known in the art and need not be described in detail herein.

The track has an inner side 12 which displays a series of longitudinally spaced drive lugs 13 for engagement with drive wheels (not shown) associated with the suspension assembly of track-propelled vehicles, and an outer side 14 which displays a series of longitudinally spaced laterally extending profiles 16, 18 and 20, preferably of identical configuration.

Each profile 16 has a central region 16' and opposite lateral band portions 16". The central region 16' has a constant height while the opposite lateral portions 16" are stepped to the opposite side edges 17 of the track.

The present invention is concerned with making the central region 16' of a rubber material having a hardness which is less than the hardness of the rubber material of the lateral portions 16" of the body. However, it has been found that, during the molding process, the soft rubber material will somewhat flow to the lateral portions so that references X and Y represent substantially the respective areas of soft and hard rubber material which, in practice, are present in the finished track.

Figure 4:
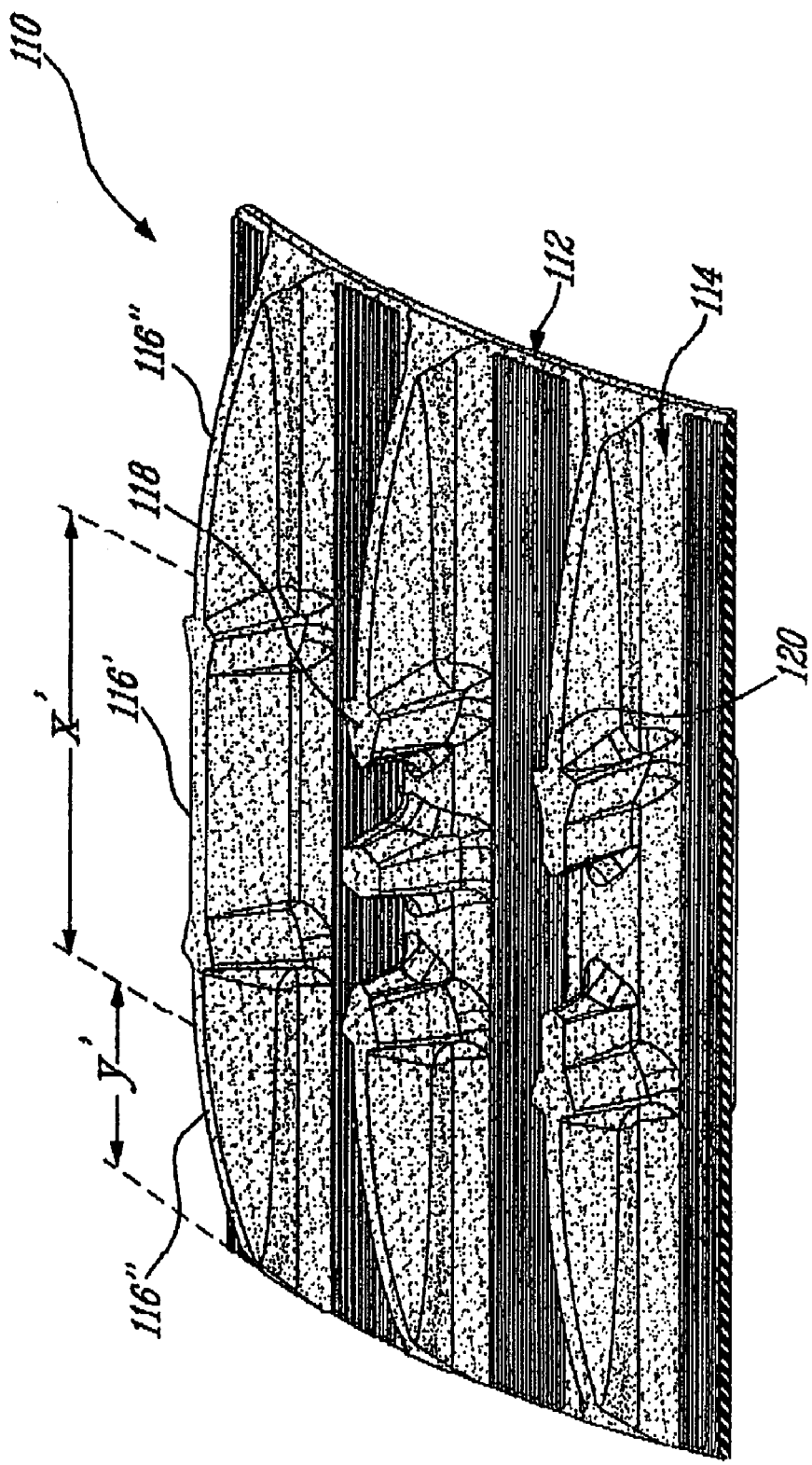
FIG. 4 is a perspective view of a portion of another track made in accordance with the present invention.

Referring to FIG. 4, there is shown a portion 110 of another endless track made in accordance with the present invention. The track is formed of molded reinforced rubber material, the construction of which is well known in the art and need not be described in detail herein.

The track has an inner side 112 which displays a series of longitudinally spaced drive lugs for engagement with drive wheels (not shown) associated with the suspension assembly of track-propelled vehicles, and an outer side 114 which displays a series of longitudinally spaced laterally extending profiles 116, 118 and 120. As you can see in FIG. 4, the profiles differ in configuration from one profile to the other. However, in this embodiment the opposite lateral portions have the same configuration.

Each profile 116 has a central region 116' and opposite lateral band portions 116". The central region 116' has a constant height while the opposite lateral portions 116" are stepped to the opposite side edges 117 of the track.

The present invention is concerned with making the central region 116' of a rubber material having a hardness which is less than the hardness of the rubber material of the lateral portions 116" of the body. However, it has been found that, during the molding process, the soft rubber material will somewhat flow to the lateral portions so that references X' and Y' represent substantially the respective areas of soft and hard rubber material which, in practice, are present in the finished track.

In one form of the invention, the rubber material of the lateral portions of the body or in areas Y and Y' has an average hardness of between about 75 and about 90 duro A, preferably 80 duro A.

In another form of the invention, the rubber material of the central portion, or areas X and X', of the body has an average hardness of between about 55 and about 75 duro A, preferably 60 duro A.

Although the invention has been described above with respect to one specific form, it will be evident to a person skilled in the art that it may be modified and refined in various ways. It is therefore wished to have it understood that the present invention should not be limited in scope, except by the terms of the following claims.

The invention claimed is:

1. An endless track for a track-propelled vehicle, comprising a body made of a reinforced rubber material, the body having a ground-engaging outer side on which are disposed a series of longitudinally spaced profiles, and an inner side; said body defining a laterally extending central portion and two opposite lateral portions; said track being characterized in that the rubber material of said lateral portions of said body has substantially a hardness which is greater than the hardness of the rubber material of the central portion of said body.

2. An endless track according to claim 1, characterized in that the rubber material of the lateral portion of the body has an average hardness of between about 75 and about 90 duro A.

3. An endless track according to claim 1, characterized in that the rubber material of the said lateral portions of the body has an average hardness of between about 80 duro A.

4. An endless track according to claim 1, characterized in that the rubber material of the said central portion of the body has an average hardness of between about 55 and about 75 duro A.

5. An endless track according to claim 1, characterized in that the rubber material of the central portion of the body has an average hardness of about 60 duro A.

6. An endless track according to claim 1, wherein each profile has an identical configuration.

7. An endless track according to claim 1, wherein some profiles vary in configuration.

8. An endless track according to claim 1, wherein opposite lateral portions of each configuration have the same configuration.

* * * * *